United States Patent
Omran et al.

(10) Patent No.: US 10,060,486 B2
(45) Date of Patent: Aug. 28, 2018

(54) SYSTEM AND METHOD FOR CONTROLLING THE ENGAGEMENT OF A PTO CLUTCH FOR A WORK VEHICLE

(71) Applicant: CNH Industrial America, LLC, New Holland, PA (US)

(72) Inventors: Ashraf Omran, Clarendon Hills, IL (US); Brian A. Hartman, Valparaiso, IN (US)

(73) Assignee: CNH Industrial America LLC, New Holland, PA (US)

( * ) Notice: Subject to any disclaimer, the term of this patent is extended or adjusted under 35 U.S.C. 154(b) by 28 days.

(21) Appl. No.: 15/255,609

(22) Filed: Sep. 2, 2016

(65) Prior Publication Data

US 2018/0066717 A1    Mar. 8, 2018

(51) Int. Cl.
*F16H 48/06*   (2006.01)
*B60K 25/02*   (2006.01)
*F16D 48/06*   (2006.01)

(52) U.S. Cl.
CPC ............. *F16D 48/06* (2013.01); *B60K 25/02* (2013.01); *F16D 2500/10437* (2013.01); *F16D 2500/3067* (2013.01); *F16D 2500/3068* (2013.01); *F16D 2500/502* (2013.01); *F16D 2500/5048* (2013.01)

(58) Field of Classification Search
None
See application file for complete search history.

(56) References Cited

U.S. PATENT DOCUMENTS

| | | | |
|---|---|---|---|
| 4,722,426 A | 2/1988 | Bellanger | |
| 5,902,211 A * | 5/1999 | Jones | F16D 48/066 192/30 W |
| 6,557,687 B1 * | 5/2003 | Herchick | F16D 25/0638 192/103 F |
| 7,048,106 B2 | 5/2006 | Hou | |
| 7,225,909 B1 | 6/2007 | Kalinsky et al. | |
| 7,234,366 B2 | 6/2007 | Hou | |
| 7,252,623 B2 | 8/2007 | Meyer et al. | |
| 7,318,788 B2 | 1/2008 | Karlsson et al. | |
| 7,416,068 B2 | 8/2008 | Ray et al. | |
| 8,182,395 B2 | 5/2012 | Jonsson | |
| 8,417,426 B2 | 4/2013 | Vermeulen | |

(Continued)

FOREIGN PATENT DOCUMENTS

GB    2530632    3/2016

*Primary Examiner* — Justin Holmes
*Assistant Examiner* — Timothy Hannon
(74) *Attorney, Agent, or Firm* — Rickard K. DeMille; Rebecca L. Henkel

(57) ABSTRACT

A method for controlling the engagement of a power take-off (PTO) clutch of a work vehicle may generally include implementing one or more recovery actions to prevent the clutch from being damaged and/or to prevent the vehicle's engine from stalling. For instance, an energy-related recovery action may be implemented when an estimated clutch energy transmitted through the PTO clutch is greater than or equal to a maximum allowable clutch energy associated with the clutch. In addition, or as an alternative thereto, a stall-related recovery action may be implemented when the engine speed is less than or equal to a predetermined engine stall speed and the speed deceleration rate for the engine is greater than or equal to a predetermined deceleration rate threshold.

19 Claims, 8 Drawing Sheets

(56) References Cited

U.S. PATENT DOCUMENTS

| | | | |
|---|---|---|---|
| 8,577,559 B2 | 11/2013 | Hel et al. | |
| 8,924,093 B2 | 12/2014 | Husson | |
| 9,002,585 B2 | 4/2015 | Porter et al. | |
| 2003/0150685 A1* | 8/2003 | Iida | B60W 10/119 |
| | | | 192/82 T |
| 2004/0061603 A1* | 4/2004 | Mack | F16D 48/06 |
| | | | 340/453 |

* cited by examiner

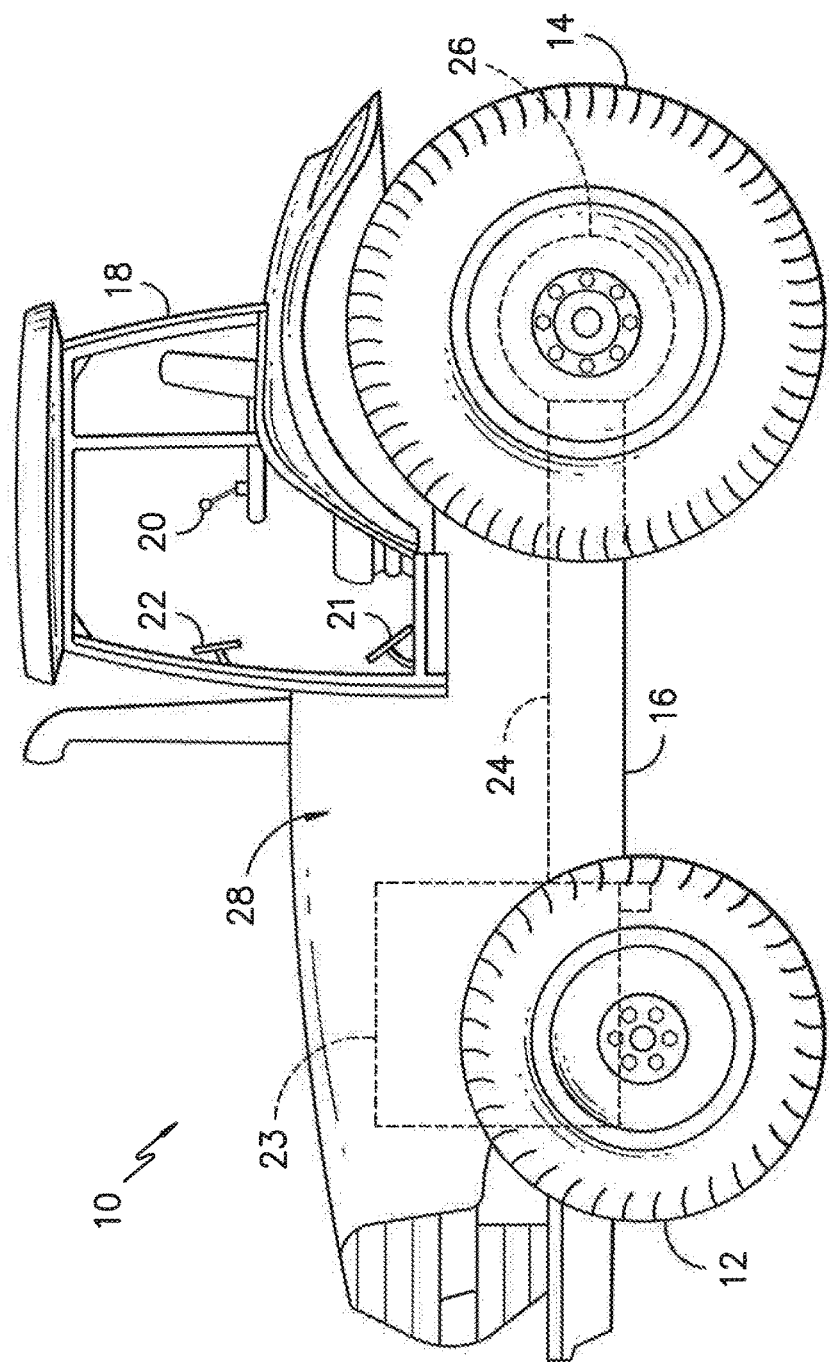
FIG. -1-

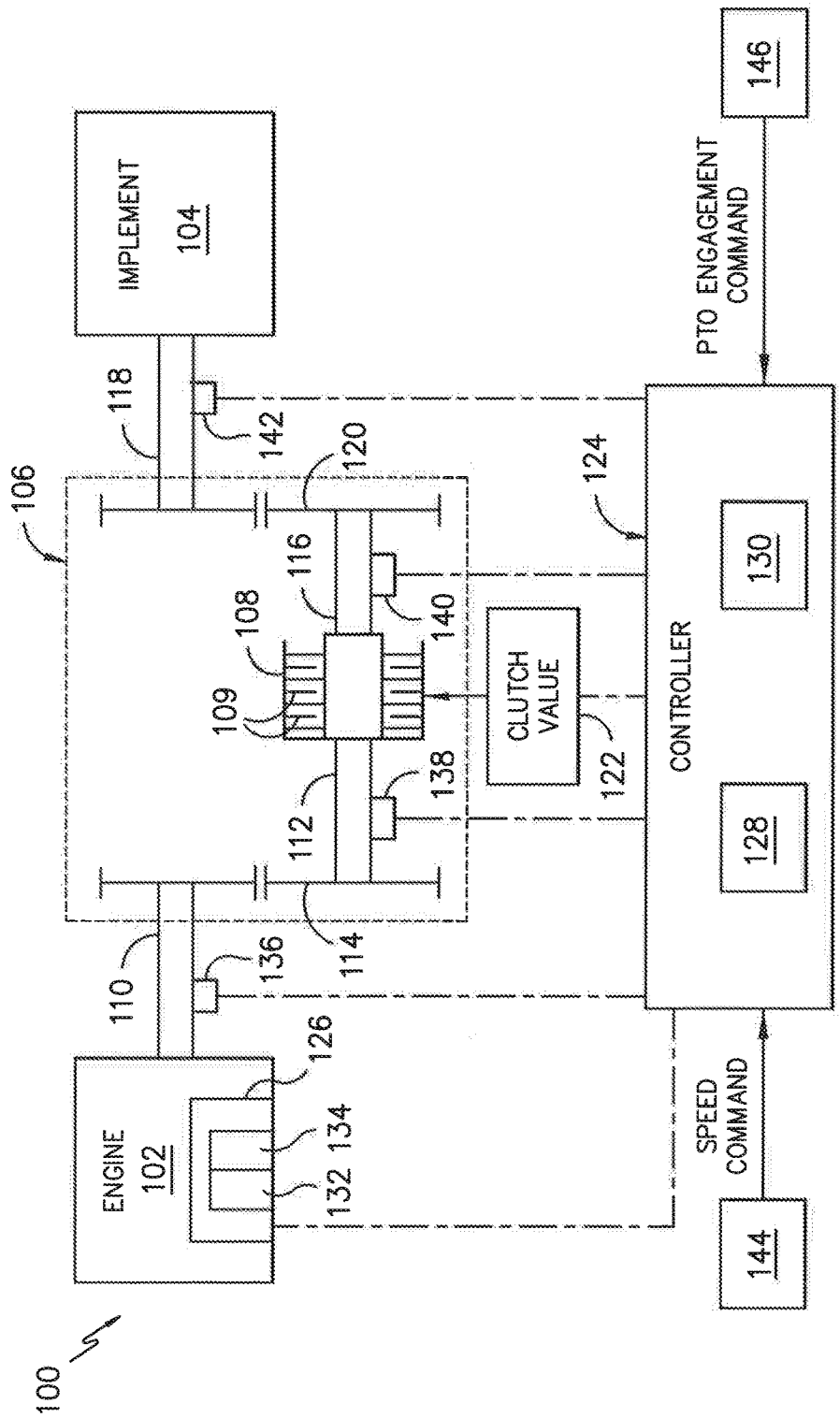
FIG. -2-

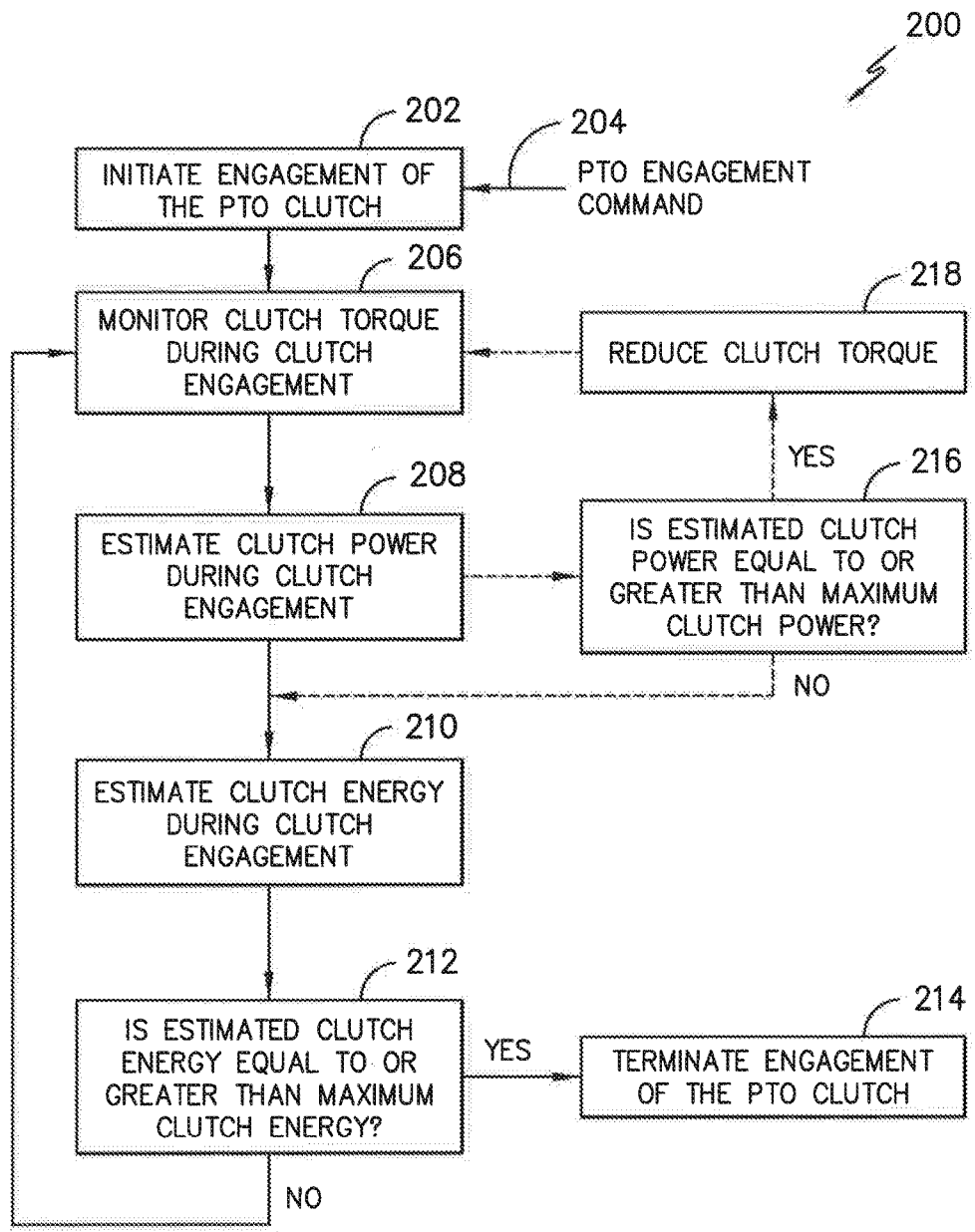
FIG. -3-

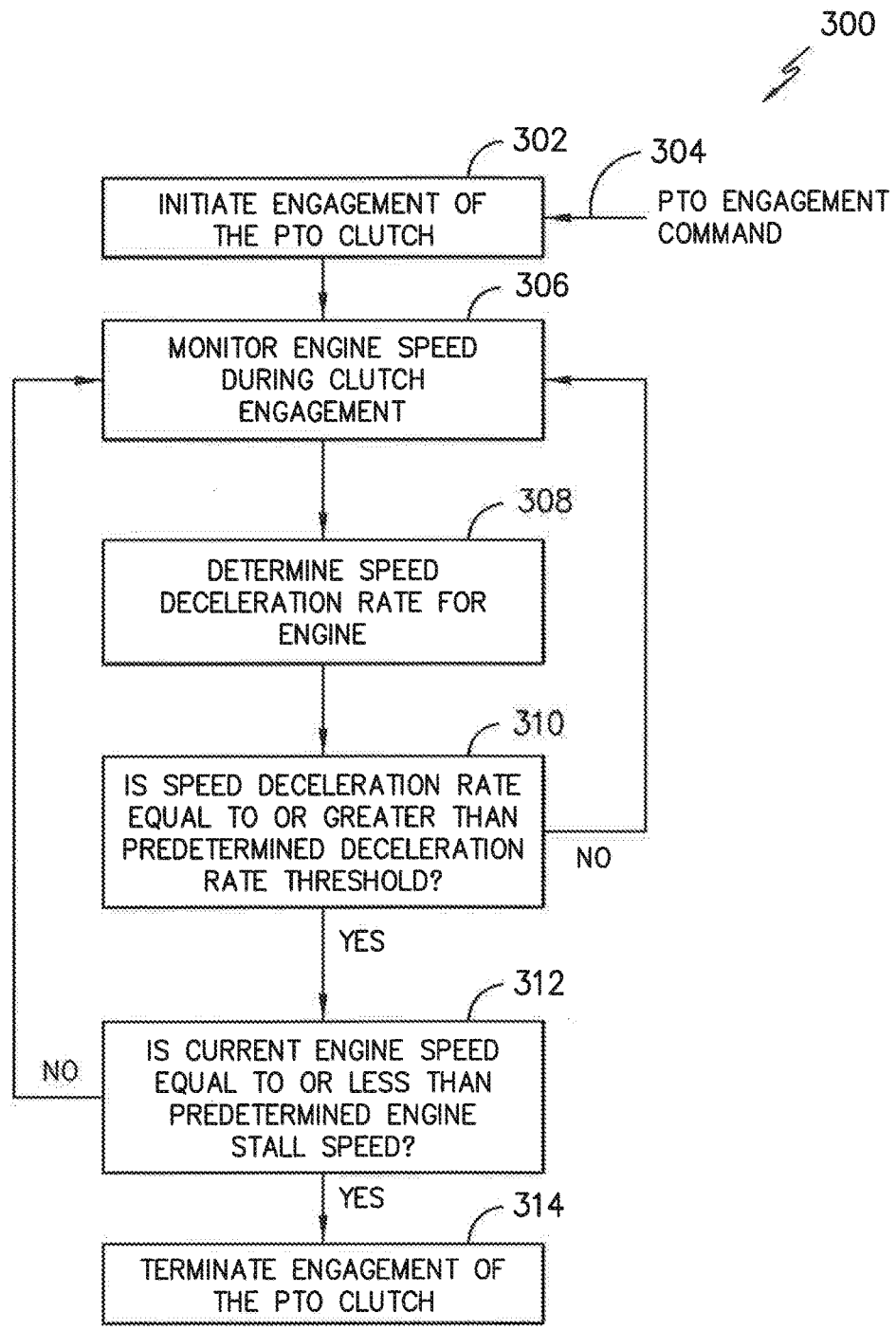
FIG. —4—

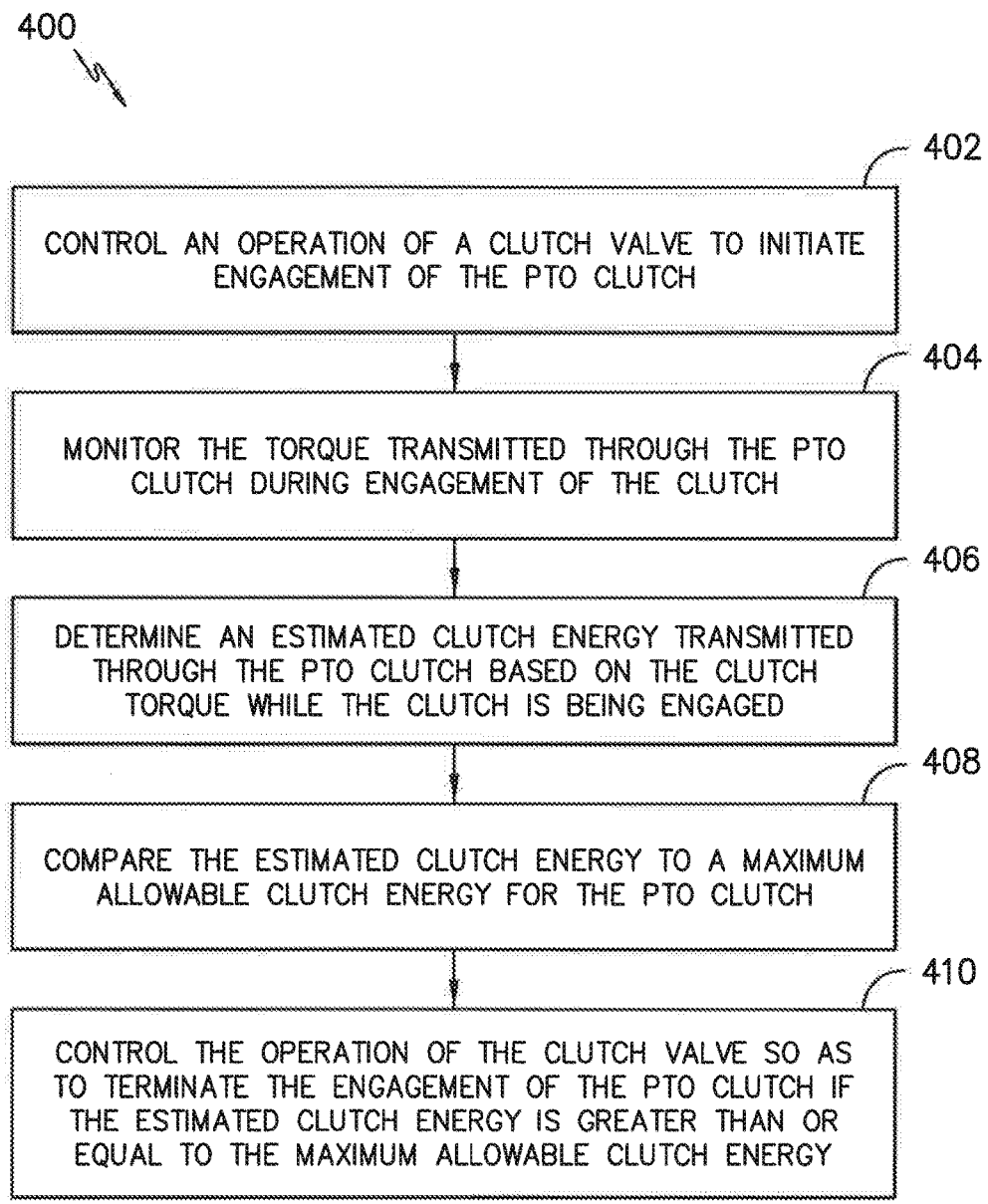
FIG. -5-

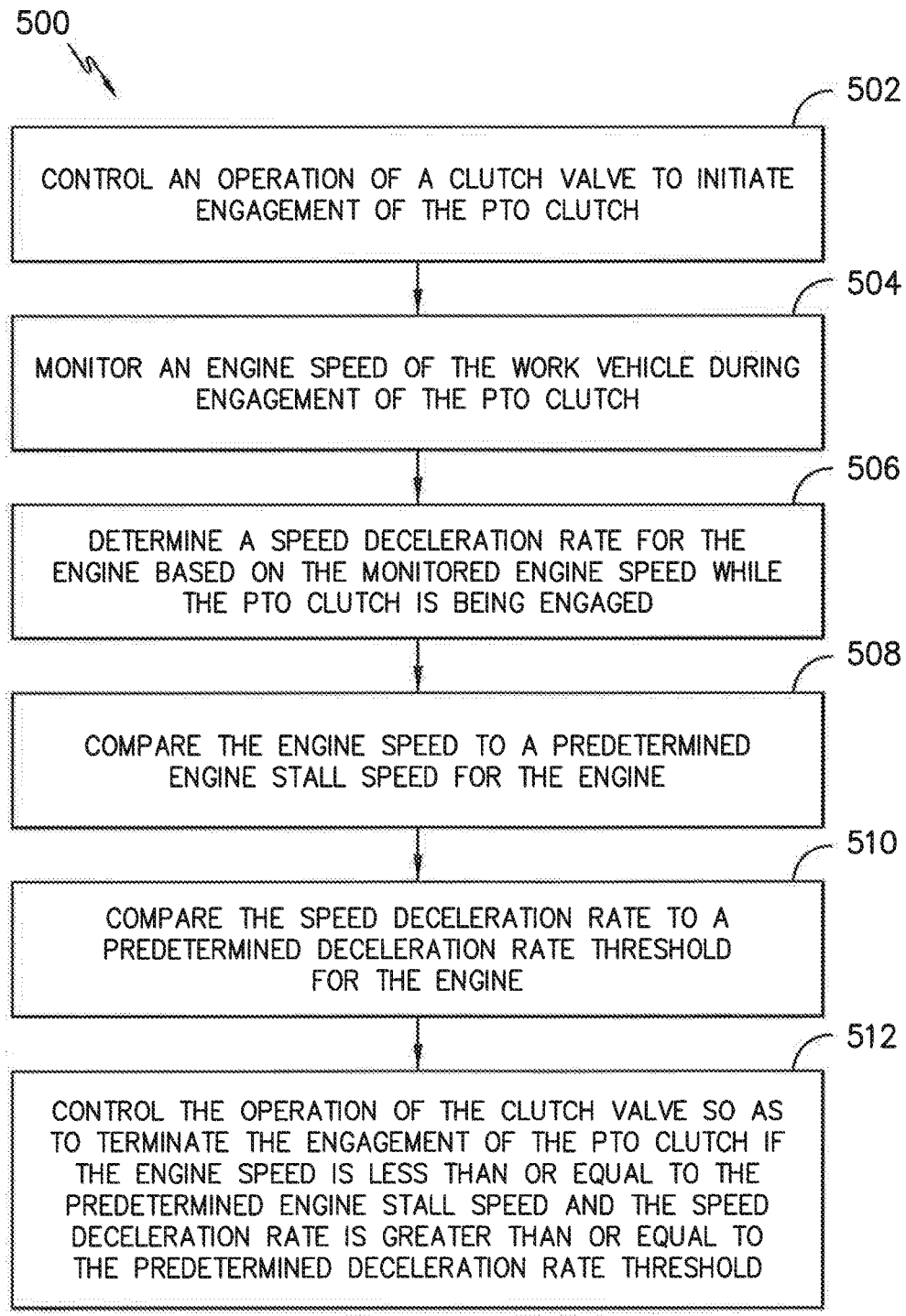
FIG. -6-

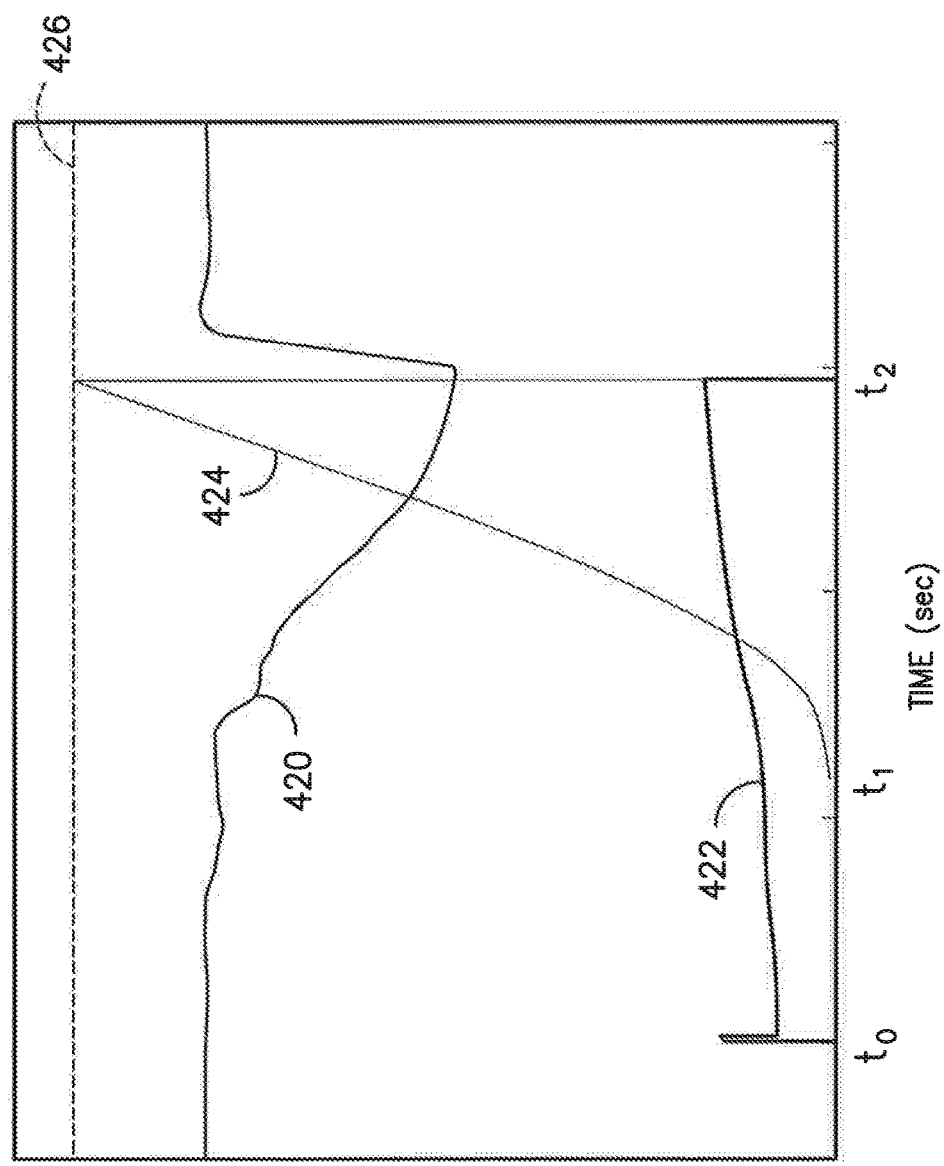
FIG. -7-

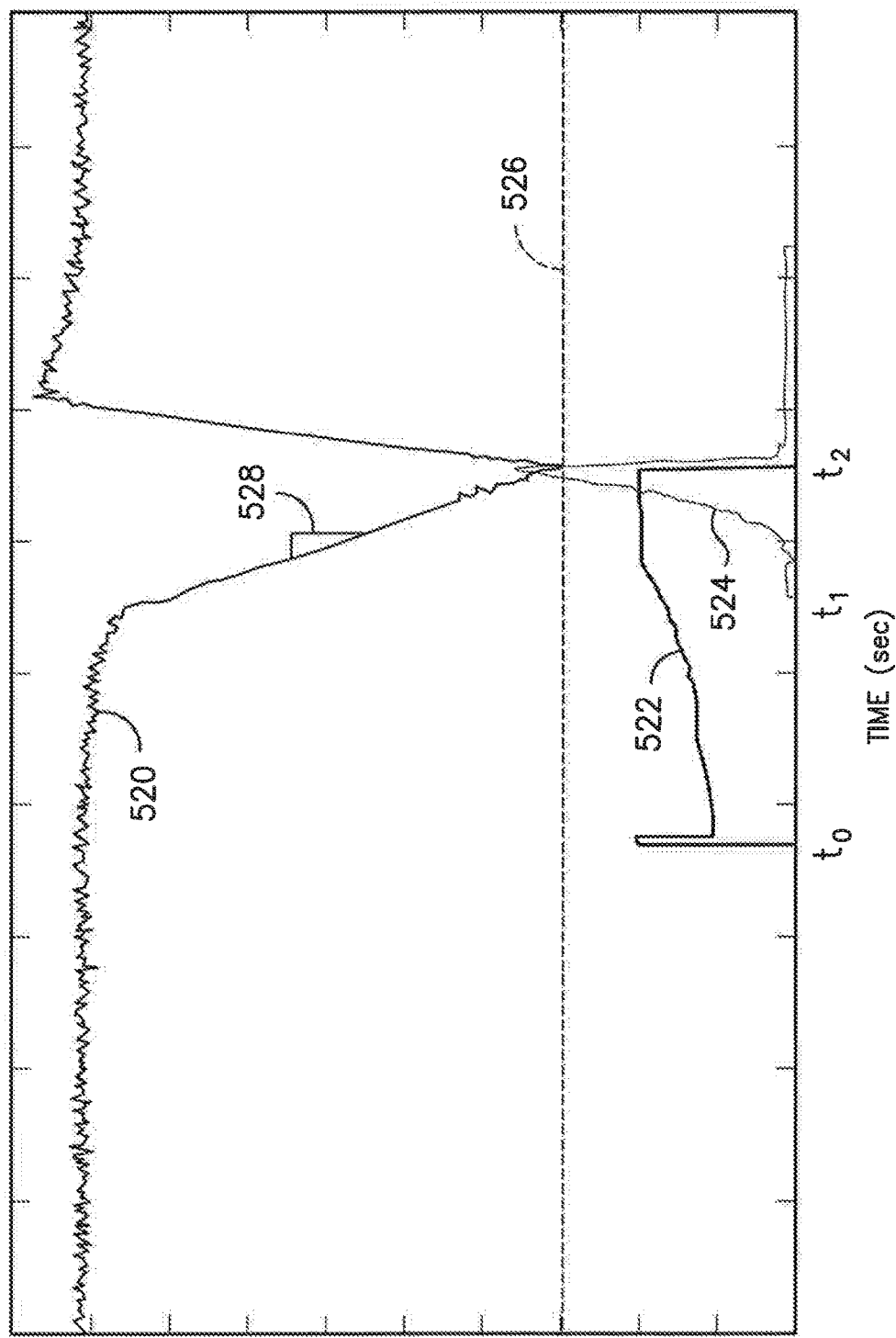
FIG. -8-

SYSTEM AND METHOD FOR CONTROLLING THE ENGAGEMENT OF A PTO CLUTCH FOR A WORK VEHICLE

FIELD OF THE INVENTION

The present subject matter relates generally to work vehicles and, more particularly, to a system and method for controlling the engagement of a power take-off (PTO) clutch for a work vehicle that utilizes one or more recovery actions to prevent the clutch from being damaged and/or to prevent the vehicle's engine from stalling.

BACKGROUND OF THE INVENTION

Current work vehicles, such as tractors and other agricultural vehicles, include an engine and a transmission, such as a power shift transmission (PST) or a continuously variable transmission (CVT), rotatably coupled to the engine. In addition, work vehicles typically include an electronic controller that is configured to control the operation of the engine and the transmission to achieve desired operation. For example, an operator may provide an input to the controller selecting a desired ground speed for the work vehicle. Based on the operator input, the controller may be configured to automatically control the operation of the engine and/or the transmission such that the actual speed of the work vehicle matches the desired speed selected by the operator.

Additionally, work vehicles often include a power take-off (PTO) that is used to provide power to various implements, such as mowers, balers, forage harvesters and spreaders. Typically, PTOs are selectively connectable to a source of rotational power, such as the vehicle's engine, by a clutch that is configured to be automatically controlled via the electronic controller of the work vehicle. To date, many PTO clutch control systems have been developed that operate under a variety of control strategies designed to provide suitable functionality. However, it has been found that these conventional clutch control systems lack the ability to implement recovery methods or actions during the clutch engagement process. As a result, current clutch control systems often control the engagement of the PTO clutch in a manner that results in engine stall and/or damage occurring to the clutch.

Accordingly, an improved system and method for controlling the engagement of a PTO clutch of a work vehicle that is capable of implementing one or more recovery actions to prevent damage to the clutch and/or to prevent stalling of the engine would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling the engagement of a power take-off (PTO) clutch of a work vehicle. The method may generally include controlling, with a computing device, an operation of a clutch valve to initiate engagement of the PTO clutch, monitoring, with the computing device, a clutch torque transmitted through the PTO clutch during engagement of the PTO clutch and, while the PTO clutch is being engaged, determining, with the computing device, an estimated clutch energy transmitted through the PTO clutch based on the clutch torque. In addition, the method may include comparing, with the computing device, the estimated clutch energy to a maximum allowable clutch energy for the PTO clutch and, if the estimated clutch energy is greater than or equal to the maximum allowable clutch energy, controlling, with the computing device, the operation of the clutch valve so as to terminate the engagement of the PTO clutch.

In another aspect, the present subject matter is directed to a method for controlling the engagement of a power take-off (PTO) clutch of a work vehicle. The method may generally include controlling, with a computing device, an operation of a clutch valve to initiate engagement of the PTO clutch, monitoring, with the computing device, an engine speed of an engine of the work vehicle during engagement of the PTO clutch, and, while the PTO clutch is being engaged, determining, by the computing device, a speed deceleration rate for the engine based on the monitored engine speed. In addition, the method may include comparing, with the computing device, the monitored engine speed to a predetermined engine stall speed for the engine, comparing, with the computing device, the speed deceleration rate to a predetermined deceleration rate threshold for the engine and, if the monitored engine speed is less than or equal to the predetermined engine stall speed and the speed deceleration rate is greater than or equal to the predetermined deceleration rate threshold, controlling, with the computing device, the operation of the clutch valve so as to terminate the engagement of the PTO clutch.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a work vehicle in accordance with aspects of the present subject matter;

FIG. 2 illustrates a schematic view of one embodiment of a system for controlling the engagement of a PTO clutch of a work vehicle in accordance with aspects of the present subject matter;

FIG. 3 illustrates a flow diagram of one embodiment of a control algorithm configured to be implemented by a controller of a work vehicle for controlling the engagement of a PTO clutch of the work vehicle in accordance with aspects of the present subject matter, particularly illustrating one or more recovery actions that may be implemented by the controller to prevent damage to the PTO clutch;

FIG. 4 illustrates a flow diagram of another embodiment of a control algorithm configured to be implemented by a controller of a work vehicle for controlling the engagement of a PTO clutch of the work vehicle in accordance with aspects of the present subject matter, particularly illustrating one or more recovery actions that may be implemented by the controller to prevent stalling of the vehicle's engine;

FIG. 5 illustrates a flow diagram of one embodiment of a method for controlling the engagement of a PTO clutch of a work vehicle in accordance with aspects of the present subject matter;

FIG. 6 illustrates a flow diagram of another embodiment of a method for controlling the engagement of a PTO clutch of a work vehicle in accordance with aspects of the present subject matter;

FIG. 7 illustrates a graphical view of one example of how the current command supplied to the PTO clutch may be adjusted based on the estimated clutch energy for the PTO clutch when implementing the method of FIG. 5 in accordance with aspects of the present subject matter; and FIG. 8 illustrates a graphical view of one example of how the current command supplied to the PTO clutch may be adjusted based on the engine speed and speed deceleration rate for the engine when implementing the method of FIG. 6 in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the engagement of a power take-off (PTO) clutch for a work vehicle that utilize one or more recovery actions to prevent the clutch from being damaged and/or to prevent the vehicle's engine from stalling. Specifically, in several embodiments, a controller of the work vehicle may be configured to estimate the energy and/or the power transmitted through the PTO clutch during the engagement process and implement, if necessary, one or more recovery actions related to the estimated clutch energy and/or clutch power. For instance, in one embodiment, the controller may be configured to compare the estimated clutch energy to a maximum allowable clutch energy for the PTO clutch. In such an embodiment, if the estimated clutch energy is equal to or greater than the maximum allowable clutch energy, the controller may be configured to immediately terminate the engagement of the PTO clutch to prevent clutch damage from occurring. Similarly, in one embodiment, the controller may be configured to compare the estimated clutch power to a maximum allowable clutch power for the PTO clutch. In such an embodiment, if the estimated clutch power is equal to or greater than the maximum allowable clutch power, the controller may be configured to reduce the current command supplied to a clutch valve associated with the PTO clutch, thereby reducing the torque transmitted through the PTO clutch and, thus, preventing the occurrence of damage to the clutch.

In addition to the above-mentioned recovery actions (or as an alternative thereto), the controller of the disclosed system may also be configured to implement one or more recovery actions designed to prevent the vehicle's engine from stalling. For example, in several embodiments, the controller may be configured to both monitor the engine speed (e.g., in RPMs) as the PTO clutch is being engaged and calculate a speed deceleration rate for the engine based on the monitored engine speed. In such embodiments, if the engine speed is less than or equal to a predetermined engine stall speed and the speed deceleration rate is greater than or equal to a predetermined deceleration rate threshold, the controller may be configured to immediately terminate the engagement of the PTO clutch to prevent the engine from stalling.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control or input devices 20, 21, 22 (e.g., levers, pedals, control panels, buttons and/or the like) for permitting an operator to control the operation of the work vehicle 10. For instance, as shown in FIG. 1, the work vehicle 10 may include an input lever 20 for controlling the engine speed of the vehicle 10 and a clutch pedal 21. In addition, the work vehicle 10 may include a control panel 22 for displaying message windows and/or alerts to the operator and/or for allowing the operator to interface with the vehicle's controller. For instance, in one embodiment, the control panel 22 may include buttons, knobs and/or any other suitable input devices that allow the operator to provide user inputs to the controller, such as by allowing the operator to provide a PTO engagement input instructing the controller to engage a PTO clutch (not shown in FIG. 1) of the work vehicle 10.

Moreover, the work vehicle 10 may also include an engine 23 and a transmission 24 mounted on the chassis 16. The transmission 24 may be operably coupled to the engine 23 and may provide variably adjusted gear ratios for transferring engine power to the wheels 14 via a drive axle assembly 26. The engine 23, transmission 24, and drive axle assembly 26 may collectively define a drivetrain 28 of the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 23, transmission 24, and differential 26 are coupled, a configuration common in smaller tractors. Still other configurations may use an articulated chassis to steer the work vehicle 10, or rely on tracks in lieu of the wheels 12, 14. Additionally, as will be described below, the work vehicle 10 may also be configured to be operably coupled to any suitable type of work implement.

Referring now to FIG. 2, a schematic diagram of one embodiment of a system 100 for controlling the clutch engagement of a power take-off (PTO) of a work vehicle 10 is illustrated in accordance with aspects of the present subject matter. As shown, the system 100 may include an engine 102 (e.g., the engine 23 of the work vehicle 10 described above) rotatably coupled to an implement 104 via a power take-off (PTO) system 106. In general, the PTO system 106 may be configured to transfer power from the engine 102 to the implement 104 so as to rotationally drive the implement 104. It should be appreciated that the implement 104 may generally correspond to any suitable implement configured to be coupled to a given work vehicle. For example, common PTO-driven implements include, but are not limited to, balers, mowers, grinder mixers, augers, drills, blowers, feeders and/or the like.

As shown in FIG. 2, the PTO system 106 may include a PTO clutch 108 configured to selectively couple the engine 102 to the corresponding PTO-driven implement 104. Specifically, as shown in the illustrated embodiment, an output shaft 110 of the engine 102 may be rotatably coupled to a PTO clutch input shaft 112 of the PTO clutch 108 (e.g., via one or more PTO input gears 114), which is, in turn, configured to be rotatably engaged with a corresponding PTO clutch output shaft 116 of the PTO system 106 via the PTO clutch 108. Additionally, the PTO clutch output shaft 116 may be rotatably coupled to a corresponding implement input shaft 118 (e.g., via one or more PTO output gears 120). Thus, by engaging the PTO clutch 108 such that the PTO clutch input and output shafts 112, 116 are rotatably coupled to one another, power from the engine 102 may be transmitted through the PTO system 106 to the implement 104. Similarly, power transmission from the engine 102 to the implement 104 may be cut-off by disengaging the PTO clutch 108 such that the PTO clutch input and output shafts 112, 116 are effectively decoupled from one another. As is generally understood, the PTO clutch 108 may include a plurality of friction plates 109 configured to be engaged within the clutch 108 for transmitting torque between the PTO clutch input and output shafts 112, 116.

In several embodiments, the PTO clutch 108 may correspond to a hydraulically-actuated clutch. Thus, as shown in FIG. 2, the system 100 may also include a clutch valve 122 (e.g., a current-controlled pressure reducing valve) configured to regulate the supply of hydraulic fluid to the PTO clutch 108, thereby allowing for the engagement and disengagement of the clutch 108 to be electronically controlled. For example, as will be described below, the current supplied to the clutch valve 122 may be directly proportional to the pressure of the hydraulic fluid supplied to the PTO clutch 108, which is, in turn, proportional to the amount of torque transmitted through the clutch 108.

It should be appreciated that the configuration of the PTO system 106 shown in FIG. 2 is simply provided to illustrate one example of a suitable PTO configuration. In general, the system and method described herein may be applied to control the clutch engagement of a PTO system having any suitable configuration that allows power to be transmitted from the engine of a work vehicle to an associated implement, including any of the various PTO system configurations currently known in the art. It should also be appreciated that a work vehicle may be configured to have multiple PTO systems. For example, a work vehicle may include both a front PTO system for transferring power from the engine to an implement positioned in the front of the vehicle and a rear PTO system for transferring power from the engine to an implement positioned in the rear of the vehicle. In addition, PTO systems may also include more than one PTO clutch.

As shown in FIG. 2, the system 100 may also include a controller 124 configured to control the operation of one or more components of the work vehicle 10, such as the engine 102 and the PTO clutch 108. For example, the controller 124 may be communicatively coupled to an engine governor 126 in order to control and/or monitor the speed and/or torque of the engine 102. Similarly, the controller 124 may be communicatively coupled to the clutch valve 122 in order to control the operation of the PTO clutch 108. For instance, the controller 124 may be configured to transmit suitable current commands to the clutch valve 122 for controlling the engagement and/or disengagement of the PTO clutch 108.

It should be appreciated the controller 124 may generally comprise any suitable processor-based device known in the art, such as one or more computing devices. Thus, in several embodiments, the controller 124 may include one or more processor(s) 128 and associated memory 130 device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 130 of the controller 124 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 130 may generally be configured to store suitable computer-readable instructions that, when implemented by the processor(s) 128, configure the controller 124 to perform various computer-implemented functions, such as the control algorithms 200, 300 described below with reference to FIGS. 3 and 4 and/or the methods 400, 500 described below with reference to FIGS. 5 and 6. In addition, the controller 124 may also include various other suitable components, such as a communications circuit or module, one or more input/output channels, a data/control bus and/or the like.

It should also be appreciated that the controller 124 may correspond to an existing controller of the work vehicle 10 (e.g., an existing engine and/or transmission controller) or the controller 124 may correspond to a separate controller. For instance, in one embodiment, the controller 124 may form all or part of a separate plug-in module that may be installed within the work vehicle 10 to allow for the disclosed system and method to be implemented without requiring additional software to be uploaded onto existing control devices of the vehicle 10.

The system 100 may also include one or more sensors for monitoring various operating parameters of the work vehicle 10. For example, as shown in FIG. 2, the controller 124 may be communicatively coupled to various sensors, such as a torque sensor 132 and/or a speed sensor 134, mounted on and/or within the engine 102 for monitoring the engine torque loads and/or the engine speed. In one embodiment, the sensor(s) 132, 134 may comprise an internal sensor of the engine governor 126. In another embodiment, the system 100 may include any other suitable sensors) configured to monitor the torque loads and/or the speed of the engine 102. For instance, a suitable sensor 136 may be provided in association with the output shaft 110 of the engine 102 for monitoring the current engine speed (e.g., in RPMs).

Moreover, the system 100 may also include one or more sensors 138, 140 (e.g., shaft encoders, shaft sensors and/or any other suitable sensors) configured to monitor the rotational speeds or angular velocities of the various shafts of the PTO system 106. For example, as shown in FIG. 2, the system 100 may include a first speed sensor 138 mounted to and/or within the PTO clutch input shaft 112 for monitoring the angular input velocity of the PTO system 106 and a second speed sensor 140 mounted to and/or within the PTO clutch output shaft 116 for monitoring the angular output velocity of the PTO system 106. The speed sensors 138, 140 may, in turn, be communicatively coupled to the controller 124 to permit the speed measurements to be transmitted to the controller 124 for subsequent processing and/or analysis. In other embodiments, as an alternative to including the first speed sensor 138, the angular input velocity of the PTO system 106 may be determined based on the engine speed. For instance, by knowing the gear ratio provided between the engine output shaft 110 and the PTO clutch input shaft 112, the angular input velocity of the PTO system 106 may be calculated based on the monitored engine speed.

In addition, the system 100 may include various other sensors configured to monitor any other suitable operating parameters of the work vehicle 10. For example, in one embodiment, a sensor 142 may be associated with the PTO clutch output shaft 116 and/or the input shaft 118 associated with the implement 104 for monitoring the torque transmitted through the PTO system 106 to the implement 104.

As shown in FIG. 2, the system 100 may also include one or more input devices 144, 146 communicatively coupled to the controller 124 to allow operator inputs to be provided to the system 100. For example, as indicated above, the work vehicle 10 may include an input device 144 (e.g., input lever 20 shown in FIG. 1) configured to permit an operator to input a speed command corresponding to a desired engine speed for the vehicle 10. Upon receipt of the speed command, the controller 124 may be configured to control the operation of the engine 102 in order to achieve the commanded engine speed. Similarly, as indicated above, the work vehicle 10 may include a suitable input device 146 (e.g., a button, switch or other suitable input device positioned on the control panel 22 shown in FIG. 1) to allow the operator to input a PTO-related command for engaging and/or disengaging the PTO clutch 108. For instance, upon receipt of a PTO engagement input from the operator, the controller 124 may be configured to control the operation of the clutch valve 122 so as to engage the PTO clutch 108, thereby allowing power to be transferred from the engine 102 to the associated implement 104.

Referring now to FIG. 3, a flow diagram of one embodiment of a control algorithm 200 that may be utilized to control the engagement of a PTO clutch of a work vehicle is illustrated in accordance with aspects of the present subject matter. In general, the control algorithm 200 will be described herein as being implemented by the controller 124 of the system 100 described above with reference to FIG. 2. However, it should be appreciated that the various processes described below may alternatively be implemented by a separate computing device or by a combination of computing devices. In addition, although FIG. 3 depicts control steps or functions performed in a particular order for purposes of illustration and discussion, the control algorithms discussed herein are not limited to any particular order or arrangement. One skilled in the art, using the disclosures provided herein, will appreciate that various steps or functions of the algorithms disclosed herein can be omitted, rearranged, combined, and/or adapted in various ways without deviating from the scope of the present disclosure.

As shown in FIG. 3, at (202), the control algorithm 200 includes initiating engagement of the PTO clutch 108. In several embodiments, the engagement of the PTO clutch 108 may be initiated upon receipt by the controller 124 of a suitable operator-initiated input. For example, as indicated above, a suitable input device 146 may be provided to allow the operator to transmit commands instructing the controller 124 to engage and/or disengage the PTO clutch 108. Thus, when an operator-initiated PTO engagement command is received (as indicated by arrow 204 in FIG. 3), the controller 124 may be configured to initiate engagement of the PTO clutch 108 by transmitting a suitable current command(s) to the clutch valve 122 for adjusting the pressure of the hydraulic fluid supplied to the clutch 108.

In several embodiments, the controller 124 may be configured to initiate engagement of the PTO clutch 108 by initially increasing the current supplied to the clutch valve 122 at a predetermined ramp-up rate for a relatively short period of time (e.g., 50-100 milliseconds). For instance, the controller 124 may be configured to increase the current supplied to the clutch valve 122 at the predetermined rate until it is detected that the PTO clutch output shaft 116 is rotating at a predetermined minimum engagement speed, thereby indicating that the PTO clutch 108 has been actuated beyond its kiss point and is partially engaged. At such point, the controller 124 may be configured to continue to increase the current supplied to the clutch valve 122 according to a predetermined schedule to allow the pressure supplied to the PTO clutch 108 to be increased to facilitate further engagement of the clutch 108.

Additionally, as shown in FIG. 3, at (206), the control algorithm 200 includes monitoring the torque transmitted through the PTO clutch 108 as the clutch 108 is being engaged. In one embodiment, the controller 124 may be configured to monitor the torque transmitted through the PTO clutch 108 using one or more torque sensors. For example, as indicated above, the controller 124 may be communicatively coupled to a torque sensor 142 configured to measure the torque transmitted through the PTO system 106. In such an embodiment, the torque sensor 142 may be configured to transmit measurement signals to the controller 124 as the PTO clutch 108 is being engaged, thereby allowing the controller 124 to continuously monitor the clutch torque during the engagement process.

As an alternative to directly measuring the clutch torque, the controller 124 may be configured to calculate or estimate the clutch torque based on one or more operating variables for the work vehicle 10 and one or more known constants associated with the PTO clutch. For example, in one embodiment, the clutch torque 124 may be calculated by the controller 124 using the following equation (Equation 1):

$$T = \mu_{dyn} * N * P * A * R_{eq} * \text{sgn}|\omega_{rel}| \tag{1}$$

wherein, T corresponds to the clutch torque, $\mu_{dyn}$ corresponds to the kinetic friction coefficient for the friction surfaces within the PTO clutch 108, N corresponds to the number of friction surfaces within the PTO clutch 108, P corresponds to the pressure of the hydraulic fluid supplied to the PTO clutch 108 by the clutch valve 122, A corresponds to the engagement surface area of the friction surfaces within the PTO clutch 108, $R_{eq}$ corresponds to the effective torque radius for the PTO clutch 108, and $\omega_{rel}$ corresponds to the relative angular velocity for the PTO clutch 108.

It should be appreciated that several of the inputs into Equation 1 may correspond to known values stored within the memory 130 of the controller 124. For example, the kinetic friction coefficient ($\mu_{dyn}$), the number of friction surfaces (N), the engagement surface area (A), and the effective torque radius ($R_{eq}$) may correspond to known values that are pre-stored within or input into the memory 130 of the controller 124 based on the specific configuration of the PTO clutch 108. As is generally understood, the effective torque radius ($R_{eq}$) for the PTO clutch 108 may be calculated according to the following equation (Equation 2):

$$R_{eq} = \frac{2}{3} \frac{R_o^3 - R_i^3}{R_o^2 - R_i^2} \tag{2}$$

wherein, $R_{eq}$ corresponds to the effective torque radius, $R_o$ corresponds to the outer radius of the friction surfaces within the PTO clutch 108, and $R_i$ corresponds to the inner radius of the friction surfaces within the PTO clutch 108.

It should also be appreciated that various other inputs into Equation 1 may correspond to variables or parameters that are continuously monitored by or otherwise available to the controller 124. For instance, as indicated above, the pressure (P) of the hydraulic fluid supplied to the PTO clutch 108 is directly proportional to the current command supplied to the clutch valve 122 by the controller 124. Thus, by knowing the current command supplied to the clutch valve 122, the controller 124 may determine the current pressure of the hydraulic fluid being supplied to the PTO clutch 108 (e.g., by using a look-up table or mathematical function stored within the controller's memory 130). Similarly, the controller 124 may be configured to determine the relative angular velocity ($\omega_{rel}$) for the PTO clutch 108 based on the monitored angular input and output velocities associated with the PTO clutch 108. For example, as indicated above, the controller 124 may be communicatively coupled to first and second speed sensors 140, 142 for monitoring the angular input and output velocities for the PTO system 106. In such instance, the controller 124 may be configured to calculate the relative angular velocity ($\omega_{rel}$) for the PTO clutch 108 using the following equation (Equation 3):

$$\omega_{rel} = \omega_i - \omega_o \quad (3)$$

wherein, $\omega_{rel}$ corresponds to the relative angular velocity, $\omega_i$ corresponds to the angular input velocity for the PTO clutch 108, and $\omega_o$ corresponds to the angular output velocity for the PTO clutch 108.

Referring still to FIG. 3, at (208), the control algorithm 200 includes estimating the clutch power transmitted through the PTO clutch 108 as the clutch 108 is being engaged. In several embodiments, the controller 124 may be configured to determine the clutch power transmitted through the PTO clutch 108 based on the clutch torque determined at (206). For example, in one embodiment, the controller 124 may be configured to estimate the clutch power using the following equation (Equation 4):

$$\overline{P}(t) = T(t) * \omega_{rel}(t) \quad (4)$$

wherein, $\overline{P}(t)$ corresponds to the clutch power transmitted through the PTO clutch 108 as a function of time (t) during the clutch engagement, T(t) corresponds to the clutch torque for the PTO clutch 108 as a function of time (t) during the clutch engagement, and $\omega_{rel}(t)$ corresponds to the relative angular velocity for the PTO clutch 108 as a function of time (t) during the clutch engagement.

Additionally, as shown in FIG. 3, at (210), the control algorithm 200 includes estimating the clutch energy transmitted through the PTO clutch 108 as the clutch 108 is being engaged. In several embodiments, the controller 124 may be configured to determine the clutch energy transmitted through the PTO clutch 108 based on the clutch power determined at (208) and/or the clutch torque determined at (206). For example, in one embodiment, the controller 124 may be configured to estimate the clutch energy using the following equation (Equation 5):

$$E(t) = \int_o^t \overline{P}(t) * dt = \int_o^t T * \omega_{rel} * dt \quad (5)$$

wherein, E(t) corresponds to clutch energy transmitted through the PTO clutch 108 as a function of time (t) during the clutch engagement, $\overline{P}(t)$ corresponds to the clutch power transmitted through the PTO clutch 108 as a function of time (t) during the clutch engagement, T corresponds to the clutch torque for the PTO clutch 108, and $\omega_{rel}$ corresponds to the relative angular velocity for the PTO clutch 108.

As indicated above, the control algorithm 200 may also incorporate one or more recovery actions designed to prevent damage from occurring to the PTO clutch 108 as the clutch 108 is being engaged. For example, as shown in FIG. 3, at (212), the control algorithm 200 may include an energy-related recovery action. Specifically, in several embodiments, the controller 124 may be configured to compare the estimated clutch energy to a maximum allowable clutch energy for the PTO clutch 108. In such embodiments, if the estimated clutch energy is equal to or exceeds the maximum allowable clutch energy for the PTO clutch 108, the controller 124 may, at (214), be configured to immediately terminate the engagement of the clutch 108. For example, the controller 124 may be configured to immediately reduce the current command being supplied to the clutch valve 122 to zero, thereby cutting off the supply hydraulic fluid to the PTO clutch 108, and, thus, fully disengaging the clutch 108. Such a recovery action may be utilized to prevent damage to the PTO clutch 108, which may allow for the clutch 108 to have an extended component life. As shown in FIG. 3, if the estimated clutch energy is less than the maximum allowable clutch energy for the PTO clutch 108, control algorithm 200 may return to (206).

It should be appreciated that, in several embodiments, the maximum allowable clutch energy may correspond to a predefined or predetermined value for the PTO clutch 108 that is stored within the controller's memory 130. For example, the maximum allowable clutch energy may be determined empirically via lab testing or by using suitable modeling software (e.g. by performing a finite element analysis on a computer model of the PTO clutch 108). Alternatively, the maximum allowable clutch energy may be provided by the clutch manufacturer. Thus, one of ordinary skill in the art will readily appreciate that the maximum allowable clutch energy may vary from clutch-to-clutch depending on the clutch configuration. However, in a particular embodiment, the maximum allowable clutch energy may range from about 400 kilojoules (kJ) to about 500 kJ, such as from about 420 kJ to about 480 kJ or from about 440 kJ to about 460 kJ and/or any other subranges therebetween.

Additionally, as shown in FIG. 3, the control algorithm 200 may also include a power-related recovery routine (shown in dashed lines in FIG. 3). Specifically, at (216), the controller 124 may, in several embodiments, be configured to compare the estimated clutch power to a maximum allowable clutch power for the PTO clutch 108. In such embodiments, if the estimated clutch power is equal to or exceeds the maximum allowable clutch power for the PTO clutch 108, the controller 124 may, at (218), be configured to reduce the amount of torque being transmitted through the PTO clutch 108. For example, the controller 124 may be configured to reduce the current command being supplied to the clutch valve 122 by a given amount, thereby reducing the torque being transmitted through the PTO clutch 108. Such a recovery action may be utilized to prevent damage to the PTO clutch 108, which may allow for the clutch 108 to have an extended component life. As shown in FIG. 3, if the estimated clutch power is less than the maximum allowable clutch power for the PTO clutch 108, control algorithm 200 may, for example, continue to (210).

It should be appreciated that, in several embodiments, the maximum allowable clutch power may correspond to a predefined or predetermined value for the PTO clutch 108 that is stored within the controller's memory 130. For example, the maximum allowable clutch power may be determined empirically via lab testing or by using suitable modeling software (e.g. by performing a finite element analysis on a computer model of the PTO clutch 108). Alternatively, the maximum allowable clutch power may be provided by the clutch manufacturer. Regardless, by knowing the maximum allowable clutch power, the controller 124 may be configured to compare such known value to the estimated clutch power to determine whether the PTO clutch 108 is operating below or above its operating limits.

It should also be appreciated that, although FIG. 3 illustrates the control algorithm 200 including both the energy-related recovery action and the power-related recovery action, the algorithm 200 may, instead, only include one of the recovery actions. For example, in one embodiment, the controller 124 may be configured to assess the estimated clutch energy relative to the maximum allowable clutch energy without assessing the estimated clutch power relative to the maximum allowable clutch power or vice versa.

Referring now to FIG. 4, a flow diagram of another embodiment of a control algorithm 300 that may be utilized to control the engagement of a PTO clutch of a work vehicle is illustrated in accordance with aspects of the present subject matter. In general, the control algorithm 300 will be described herein as being implemented by the controller 124 of the system 100 described above with reference to FIG. 2. However, it should be appreciated that the various processes described below may alternatively be implemented by a separate computing device or by a combination of computing devices. In addition, although FIG. 4 depicts control steps or functions performed in a particular order for purposes of illustration and discussion, the control algorithms discussed herein are not limited to any particular order or arrangement. One skilled in the art, using the disclosures provided herein, will appreciate that various steps or functions of the algorithms disclosed herein can be omitted, rearranged, combined, and/or adapted in various ways without deviating from the scope of the present disclosure.

As shown in FIG. 4, at (302), the control algorithm 300 includes initiating engagement of the PTO clutch 108. As indicated above, the engagement of the PTO clutch 108 may be initiated upon receipt by the controller 124 of a suitable operator-initiated PTO engagement command (as indicated by arrow 304 in FIG. 4). Thereafter, the controller 124 may be configured to initiate engagement of the PTO clutch 108 by transmitting a suitable current command(s) to the clutch valve 122 for adjusting the pressure of the hydraulic fluid supplied to the clutch 108.

Additionally, at (306), the control algorithm 300 includes monitoring the engine speed of the engine 23 of the work vehicle 10 as the PTO clutch 108 is being engaged. In one embodiment, the controller 124 may be configured to monitor the engine speed of the engine 23 using one or more speed sensors. For example, as indicated above, the controller 124 may be communicatively coupled to a speed sensor 134 configured to measure the engine speed. In such an embodiment, the speed sensor 134 may be configured to transmit measurement signals to the controller 124 as the PTO clutch 108 is being engaged, thereby allowing the controller 124 to continuously monitor the engine speed during the engagement process.

Moreover, at (308), the control algorithm 300 includes determining a speed deceleration rate for the engine as the PTO clutch 108 as being engaged. In general, the controller 124 may be configured to determine the speed deceleration rate for the engine based on the monitored engine speed. For example, in one embodiment, the controller 124 may be configured to directly calculate the speed deceleration rate using the speed measurement signals provided by the speed sensor 134. For instance, the controller 124 may calculate speed deceleration rate by subtracting the most recent engine speed measurement received from the speed sensor 134 from a previous engine speed measurement received from the speed sensor 134 and by then dividing the difference between the speed measurements by the amount of time elapsed between the two measurements.

Alternatively, the controller 124 may be configured to utilize a curve fitting algorithm to calculate the speed deceleration rate. For instance, in one embodiment, a linear curve fitting algorithm may be utilized to calculate the speed deceleration rate. In such an embodiment, it may be assumed that the engine speed can be modeled as a linear function of time over a given time period (e.g., 0.2 seconds) such that the linear approximation across such time period provides the rate of change in the engine speed. For instance, the engine speed may be modeled using the following equation (Equation 6):

$$E_{rpm}(t) = A*t + B + e(t) \qquad (6)$$

wherein, $E_{rpm}(t)$ corresponds to the modeled engine speed as a function of time, A corresponds to the speed deceleration rate, t corresponds to the time elapsed, B corresponds to a constant value, and e(t) corresponds to the error between the modeled engine speed ($E_{rpm}(t)$) and the engine speed derived from the sensor measurements.

It should be appreciated that, in one embodiment, the inputs A and B from Equation 6 may be calculated using a least squares estimation. For instance, the inputs A and B may be calculated using the following equation set (Equation 7):

$$E_{rpm}|_{z_N} \approx A*t|_{z_N} + B + e|_{z_N} \qquad (7)$$

$$E_{rpm}|_{z_{N-1}} \approx A*t|_{z_{N-1}} + B + e|_{z_{N-1}}$$

$$\vdots$$

$$E_{rpm}|_{z_2} \approx A*t|_{z_2} + B + e|_{z_2}$$

$$E_{rpm}|_{z_1} \approx A*t|_{z_1} + B + e|_{z_1}$$

wherein, $E_{rpm}$ corresponds to the modeled engine speed, A corresponds to the speed deceleration rate, t corresponds to the time, B corresponds to a constant value, and e corresponds to the error between the modeled engine speed ($E_{rpm}$) and the engine speed derived from the sensor measurements.

It should be appreciated that, as an alternative to using a least squares estimation, the inputs A and B from Equation 6 may be calculated using any other suitable estimation algorithm. Additionally, although Equation 6 utilizes a linear curve fitting algorithm, any other suitable curve fitting algorithm may be utilized to determine the speed deceleration rate for the engine 23.

Referring still to FIG. 4, the control algorithm 300 may also include one or more recovery actions designed to prevent the engine 23 from stalling as the PTO clutch 108 is being engaged. Specifically, in several embodiments, the controller 124 may, at (310) and (312), be configured to compare both the calculated speed deceleration rate to a predetermined deceleration rate threshold defined for the engine 23 and the current engine speed to a predetermined engine stall speed. In such embodiments, if the speed deceleration rate is equal to or greater than the predetermined deceleration rate threshold and the current engine speed is equal to or less than the predetermined engine stall speed, the controller 124 may, at (314), be configured to immediately terminate the engagement of the clutch 108. For example, the controller 124 may be configured to immediately reduce the current command being supplied to the clutch valve 122 to zero, thereby cutting off the supply hydraulic fluid to the PTO clutch 108, and, thus, fully disengaging the clutch 108. Such a recovery action may be utilized to immediately decouple the PTO clutch 108 from the engine 23 so as to prevent engine stall. As shown in FIG. 4, if, instead, the speed deceleration rate is less than the predetermined deceleration rate threshold or if the current engine speed is greater than the predetermined engine stall speed 108, the control algorithm 200 may return to (306).

It should be appreciated that, in several embodiments, the predetermined deceleration rate threshold may correspond to a predefined or predetermined value for the engine 23 that is stored within the controller's memory 130. For example, the predetermined deceleration rate threshold may be determined empirically via lab testing or by using suitable modeling software. Alternatively, the predetermined deceleration rate threshold may be provided by the engine manufacturer. Thus, one of ordinary skill in the art will readily appreciate that the predetermined deceleration rate threshold may vary from engine-to-engine and/or from vehicle-to-vehicle based on the engine configuration and/or the vehicle configuration. However, in a particular embodiment, the predetermined deceleration rate threshold may correspond to a speed deceleration rate of at least about 20 RPM per second (RPM/s), such as at least about 25 RPM/s or at least about 30 RPM/s and/or any other subranges therebetween.

Additionally, it should be appreciated that, in several embodiments, the predetermined engine stall speed may correspond to a predefined or predetermined value for the engine 23 that is stored within the controller's memory 130. For example, the predetermined engine stall speed may be determined empirically via lab testing or by using suitable modeling software. Alternatively, the predetermined engine stall speed may be provided by the engine manufacturer. Thus, one of ordinary skill in the art will readily appreciate that the predetermined engine stall speed may vary from engine-to-engine and/or from vehicle-to-vehicle based on the engine configuration and/or the vehicle configuration. However, in a particular embodiment, the predetermined engine stall speed may range from about 450 RPM to about 700 RPM, such as from about 550 RPM to about 650 RPM or from about 575 RPM to about 625 RPM and/or any other subranges therebetween.

Referring now to FIG. 5, a flow diagram of one embodiment of a method 400 for controlling the engagement of a PTO clutch of a work vehicle is illustrated in accordance with aspects of the present subject matter. In general, the method 400 will be described herein with reference to the system 100 described above with reference to FIG. 2 and the control algorithm 200 described above with reference to FIG. 3. However, it should be appreciated by those of ordinary skill in the art that the disclosed method 400 may be implemented within any other system and/or using any other suitable control algorithm. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (402), the method 400 may include controlling an operation of a clutch valve to initiate engagement of the PTO clutch. For example, as indicated above, the controller 124 may be configured to transmit current commands to the clutch valve 122 associated with the PTO clutch 108 in order to regulate the pressure of the hydraulic fluid supplied to the clutch 108, thereby allowing the controller 124 to control the engagement of the PTO clutch 108.

Additionally, at (404), the method 400 may include monitoring the torque transmitted through the PTO clutch during engagement of the clutch. For example, as indicated above, the controller 124 may be configured to monitor the clutch torque as the PTO clutch 108 is being engaged using one or more torque sensors and/or by estimating the clutch torque based on one or more monitored operating parameters.

Moreover, at (406), the method 400 may include determining an estimated clutch energy transmitted through the PTO clutch based on the clutch torque while the clutch is being engaged. For instance, as indicated above, the controller 124 may be configured to calculate an estimated clutch power transmitted through the PTO clutch 124 based on the clutch torque. Thereafter, the controller 124 may estimate the clutch energy as a function of the clutch torque.

Further, at (408), the method 400 may include comparing the estimated clutch energy to a maximum allowable clutch energy for the PTO clutch. For instance, as indicated above, the controller 124 may be configured to compare the estimated clutch energy to a predetermined maximum allowable clutch energy stored within the controller's memory 130. In such instance, if the estimated clutch energy is equal to or exceeds the maximum allowable clutch energy, the method 400 may, at (410), including controlling the operation of the clutch valve so as to terminate the engagement of the PTO clutch. Specifically, the controller 124 may be configured to reduce the current command supplied to the clutch valve 122 to zero such that the PTO clutch 108 is disengaged from the engine 23, thereby preventing damage to the clutch 108.

A graphical view showing one example implementation of the method 400 described above with reference to FIG. 5 is illustrated in FIG. 7 in accordance with aspects of the present subject matter. Specifically, the graph of FIG. 7 charts various operating parameters for the work vehicle 10 in relation to time, namely the engine speed (indicated by line 420), the current command for the PTO clutch 108 (indicated by line 422), and the estimated clutch energy transmitted through the PTO clutch 108 during clutch engagement (indicated by line 424). As shown in FIG. 7, at time ($t_0$), the clutch engagement process for the PTO clutch 108 may be initiated. Upon initiation of the clutch engagement process, the current command 422 supplied to the clutch valve 122 may be ramped up to facilitate engagement of the PTO clutch 108. As shown in FIG. 7, at time ($t_1$), the estimated clutch energy 424 for the PTO clutch 108 may begin to increase from a minimum value as energy begins to be transmitted through the clutch 108. As indicated above, the controller 124 may be configured to continuously compare the estimated clutch energy 424 to a predetermined maximum allowable clutch energy for the PTO clutch 108 (indicated by dashed line 426 in FIG. 7). As shown in FIG. 7, in the event that the estimated clutch energy 424 increases up to the value set for the predetermined maximum allowable clutch energy 426 (e.g., at time ($t_2$)), the controller 124 may be configured to immediately reduce the current command 422 supplied to the clutch valve 122 to zero such that the PTO clutch 108 is disengaged from the engine 23.

Referring now to FIG. 6, a flow diagram of another embodiment of a method 500 for controlling the engagement of a PTO clutch of a work vehicle is illustrated in accordance with aspects of the present subject matter. In general, the method 500 will be described herein with reference to the system 100 described above with reference to FIG. 2 and the control algorithm 300 described above with reference to FIG. 4. However, it should be appreciated by those of ordinary skill in the art that the disclosed method 500 may be implemented within any other system and/or using any other suitable control algorithm. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (502), the method 500 may include controlling an operation of a clutch valve to initiate engagement of the PTO clutch. For example, as indicated above, the controller 124 may be configured to transmit current commands to the clutch valve 122 associated with the PTO clutch 108 in order to regulate the pressure of the hydraulic fluid supplied to the clutch 108, thereby allowing the controller 124 to control the engagement of the PTO clutch 108.

Additionally, at (504), the method 500 may include monitoring an engine speed of the work vehicle during engagement of the PTO clutch. For example, as indicated above, the controller 124 may be configured to monitor the engine speed as the PTO clutch 108 is being engaged via one or more speed sensors communicatively coupled to the controller 124.

Moreover, at (506), the method 500 may include determining a speed deceleration rate for the engine based on the monitored engine speed while the PTO clutch is being engaged. For example, as indicated above, the controller 124 may be configured to determine the speed deceleration rate for the engine based solely on the measurements provided by the engine speed sensor and/or by utilizing a curve fitting algorithm (e.g., a linear curve fitting algorithm).

Further, at (508) and (510), the method 500 may include comparing the engine speed to a predetermined engine stall speed for the engine and comparing the speed deceleration rate to a predetermined deceleration rate threshold for the engine. For instance, as indicated above, the controller 124 may be configured to compare the monitored engine speed to a predetermined engine stall speed stored within the controller's memory 130. Similarly, the controller 124 may be configured to compare the speed deceleration rate to a predetermined deceleration rate threshold stored within the controller's memory 130. In such instance, if the engine speed is equal to or less than the predetermined engine stall speed and the speed deceleration rate is equal to or greater than the predetermined deceleration rate threshold, the method 500 may, at (510), including controlling the operation of the clutch valve so as to terminate the engagement of the PTO clutch. Specifically, the controller 124 may be configured to reduce the current command supplied to the clutch valve 122 to zero such that the PTO clutch 108 is disengaged from the engine 23, thereby preventing engine stall.

A graphical view showing one example implementation of the method 500 described above with reference to FIG. 6 is illustrated in FIG. 8 in accordance with aspects of the present subject matter. Specifically, the graph of FIG. 8 charts various operating parameters for the work vehicle 10 in relation to time, namely the engine speed (indicated by line 520), the current command for the PTO clutch 108 (indicated by line 522), and the output shaft speed for the PTO clutch 108 (indicated by line 524). As shown in FIG. 8, at time ($t_0$), the clutch engagement process for the PTO clutch 108 may be initiated. Upon initiation of the clutch engagement process, the current command 522 supplied to the clutch valve 122 may be ramped up to facilitate engagement of the PTO clutch 108. As shown in FIG. 8, at time ($t_1$), the output shaft speed 524 for the PTO clutch 108 may begin to increase from a minimum value as energy begins to be transmitted through the clutch 108. Additionally, at time ($t_1$), the engine speed 520 may begin to decrease as the PTO clutch 108 is being engaged. For instance, as shown in FIG. 8, the engine speed 520 may decrease from time ($t_1$) to time ($t_2$) as the clutch command 522 is increased in an attempt to complete the clutch engagement process. As indicated above, the controller 124 may be configured to continuously compare the engine speed 520 to the predetermined engine stall speed stored within the controller's memory 130 (e.g., indicated by dashed line 526 in FIG. 8). Moreover, the controller 124 may be configured to compare the speed deceleration rate for the engine (indicated by slope line 528 in FIG. 8) to the predetermined deceleration rate threshold stored within the controller's memory 130. As shown in FIG. 8, in the event that the engine speed 520 decreases down to the predetermined engine stall speed 526 and the speed deceleration rate 528 is equal to or greater than the predetermined deceleration rate threshold (e.g., at time ($t_2$)), the controller 124 may be configured to immediately reduce the current command 522 supplied to the clutch valve 122 to zero such that the PTO clutch 108 is disengaged from the engine 23.

It should be appreciated that, although the methods 400, 500 shown in FIGS. 5 and 6 have been described separately herein, such methods may be implemented in combination. For instance, the controller 124 may, in one embodiment, by configured to implement both the control algorithm of FIG. 3 and the control algorithm of FIG. 4 in order to implement recovery actions designed to both prevent damage to the PTO clutch 108 and prevent the engine 23 from stalling.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling the engagement of a power take-off (PTO) clutch of a work vehicle, the method comprising:
    controlling, with a computing device, an operation of a clutch valve to initiate engagement of the PTO clutch;
    monitoring, with the computing device, a clutch torque transmitted through the PTO clutch during engagement of the PTO clutch;

while the PTO clutch is being engaged, determining, with the computing device, an estimated clutch energy transmitted through the PTO clutch based on the clutch torque;
comparing, with the computing device, the estimated clutch energy to a maximum allowable clutch energy for the PTO clutch; and
if the estimated clutch energy is greater than or equal to the maximum allowable clutch energy, controlling, with the computing device, the operation of the clutch valve so as to terminate the engagement of the PTO clutch.

2. The method of claim 1, wherein controlling the operation of the clutch valve to initiate engagement of the PTO clutch comprising increasing a current command transmitted to the clutch valve.

3. The method of claim 2, wherein controlling the operation of the clutch valve so as to terminate the engagement of the PTO clutch comprises immediately reducing the current command to zero when the estimated clutch energy is greater than or equal to maximum allowable clutch energy.

4. The method of claim 1, wherein monitoring the clutch torque transmitted through the PTO clutch comprises receiving measurement signals from a torque sensor configured to monitor the clutch torque.

5. The method of claim 1, wherein monitoring the clutch torque transmitted through the clutch valve comprises estimating the clutch torque based on a pressure of hydraulic fluid supplied by the clutch valve.

6. The method of claim 1, wherein the maximum clutch energy ranges from about 400 kilojoules (kJ) to about 500 kJ.

7. The method of claim 1, wherein determining the estimated clutch energy transmitted through the PTO clutch comprises:
determining an estimated clutch power transmitted through the PTO clutch based on the clutch torque and a relative angular velocity associated with the PTO clutch; and
determining the estimated clutch energy as a function of the estimated clutch power.

8. The method of claim 7, further comprising:
comparing the estimated clutch power to a maximum allowable clutch power for the PTO clutch; and
if the estimated clutch power is greater than or equal to the maximum allowable clutch power, reducing a current command supplied to the clutch valve in order to reduce the torque transmitted through the PTO clutch.

9. The method of claim 1, further comprising:
monitoring an engine speed of an engine of the work vehicle during engagement of the PTO clutch;
while the PTO clutch is being engaged, determining a speed deceleration rate for the engine based on the monitored engine speed; and
if the monitored engine speed is less than or equal to a predetermined engine stall speed for the engine and the speed deceleration rate is greater than or equal to a predetermined deceleration rate threshold for the engine, controlling the operation of the clutch valve so as to terminate the engagement of the PTO clutch.

10. The method of claim 9, wherein the predetermined engine stall speed ranges from about 450 RPM to about 700 RPM and the predetermined deceleration rate threshold is equal to at least about 20 RPM per second.

11. A method for controlling the engagement of a power take-off (PTO) clutch of a work vehicle, the method comprising:

controlling, with a computing device, an operation of a clutch valve to initiate engagement of the PTO clutch;
monitoring, with the computing device, an engine speed of an engine of the work vehicle during engagement of the PTO clutch;
while the PTO clutch is being engaged, determining, by the computing device, a speed deceleration rate for the engine based on the monitored engine speed;
comparing, with the computing device, the monitored engine speed to a predetermined engine stall speed for the engine;
comparing, with the computing device, the speed deceleration rate to a predetermined deceleration rate threshold for the engine; and
if the monitored engine speed is less than or equal to the predetermined engine stall speed and the speed deceleration rate is greater than or equal to the predetermined deceleration rate threshold, controlling, with the computing device, the operation of the clutch valve so as to terminate the engagement of the PTO clutch.

12. The method of claim 11, wherein determining the speed deceleration rate for the engine comprises estimating the speed deceleration rate using a curve fitting algorithm.

13. The method of claim 12, wherein the curve fitting algorithm corresponds to a linear curve fitting algorithm.

14. The method of claim 11, wherein the predetermined engine stall speed ranges from about 450 RPM to about 700 RPM.

15. The method of claim 11, wherein the predetermined deceleration rate threshold is equal to at least about 20 RPM per second.

16. The method of claim 11, wherein controlling the operation of the clutch valve to initiate engagement of the PTO clutch comprising increasing a current command transmitted to the clutch valve.

17. The method of claim 16, wherein controlling the operation of the clutch valve so as to terminate the engagement of the PTO clutch comprises immediately reducing the current command to zero when the monitored engine speed is less than or equal to the predetermined engine stall speed and the speed deceleration rate is greater than or equal to the predetermined deceleration rate threshold.

18. The method of claim 11, further comprising:
monitoring a clutch torque transmitted through the PTO clutch during engagement of the PTO clutch;
while the PTO clutch is being engaged, determining an estimated clutch energy transmitted through the PTO clutch based on the torque clutch; and
if the estimated clutch energy is greater than or equal to a maximum allowable clutch energy associated with the PTO clutch, controlling the operation of the clutch valve so as to terminate the engagement of the PTO clutch,
wherein determining the estimated clutch energy transmitted through the PTO clutch comprises:
determining an estimated clutch power transmitted through the PTO clutch during engagement of the PTO clutch based on the clutch torque and a relative angular velocity associated with the PTO clutch; and
determining the estimated clutch energy as a function of the estimated clutch power.

19. The method of claim 18, further comprising:
comparing the estimated clutch power to a maximum allowable clutch power for the PTO clutch; and
if the estimated clutch power is greater than or equal to the maximum allowable clutch power, reducing a current command supplied to the clutch valve in order to reduce the torque transmitted through the PTO clutch.

\* \* \* \* \*